United States Patent [19]
Ashman et al.

[11] Patent Number: 4,807,955
[45] Date of Patent: Feb. 28, 1989

[54] OPTO-ELECTRICAL CONNECTING MEANS

[75] Inventors: John J. Ashman, Newport, Pa.; Hermanus P. J. Gilissen, Esch, Netherlands

[73] Assignee: AMP Incorporated, Harrisburg, Pa.

[21] Appl. No.: 82,753

[22] Filed: Aug. 6, 1987

[51] Int. Cl.$^4$ .............................. G02B 6/36
[52] U.S. Cl. .............................. 350/96.20
[58] Field of Search ............... 350/96.20, 96.21, 96.22, 350/96.15, 96.17; 250/227, 552; 357/17, 19, 30, 74, 80; 439/79

[56] References Cited

U.S. PATENT DOCUMENTS

| | | | |
|---|---|---|---|
| 3,706,874 | 12/1972 | Lockhard | 235/61.11 E |
| 3,774,015 | 11/1972 | Lockhard | 235/61.11 E |
| 4,264,127 | 4/1981 | Schumacher et al. | 350/96.20 |
| 4,286,145 | 8/1981 | Palmer | 235/454 |
| 4,290,667 | 9/1981 | Chown | 350/96.18 |
| 4,427,879 | 1/1984 | Becher et al. | 250/215 |
| 4,461,537 | 7/1984 | Raymer, II et al. | 350/96.20 |
| 4,597,631 | 7/1986 | Flores | 350/96.20 |
| 4,669,820 | 6/1987 | Ten Berge | 350/96.20 |

FOREIGN PATENT DOCUMENTS

| | | |
|---|---|---|
| 3047322 | 7/1982 | Fed. Rep. of Germany . |
| 56-59213 | 5/1981 | Japan . |
| 58-132874 | 8/1983 | Japan . |
| 2173917 | 10/1986 | United Kingdom ............ 350/96.15 |

OTHER PUBLICATIONS

"Integrated Connector/Rail System for Small Printed Circuit Cards", IBM Technical Disclosure Bulletin, vol. 30, No. 6, Nov. 1987, p. 34, 439/79.
"AMP Model 417 Serial Optical Card/Badge Readers", AMP Data Sheet 79-517, Rev. 3-81.
"The Astron 38 Q Connector", Astar International Co., Inc.
"S Ram Memory Cassette CC-Style".

Primary Examiner—William L. Sikes
Assistant Examiner—Phan T. Heartney
Attorney, Agent, or Firm—Eric J. Groen

[57] ABSTRACT

An electronic circuit card (4) is matable with a connector (3). The connector (3) comprises a terminal block (4) having terminals (22) connected to conductors (24) of a circuit board (26). First opto-electrical interface modules (15) encapsulated into the block (4), cooperate with second opto-electrical interface modules encapsulated into the leading margin (42) of the card (4) to connect the circuit (40) of the board (4) to the conductors (24) of the circuit board (26), when the card (4) has been mated with the connector (3).

17 Claims, 3 Drawing Sheets

OPTO-ELECTRICAL CONNECTING MEANS

This invention relates to opto-electrical connecting means for connecting an electrical circuit of a cassette to terminals of an electrical connector. Such a cassette may be in the form of a card, known as a "smartcard", having encapsulated therein a circuit board upon which the components of the circuit are mounted. The circuit may be, for example, a memory circuit such as a RAM or a ROM circuit. The connector may be used to connect the circuit of the cassette to an external circuit, for example in a computer, a telefax apparatus or other business machine. In a known cassette and connector assembly, the electrical connections between the cassette circuit and the terminals of the connector are made by way of a further connector secured to a margin of the cassette and which has terminals which mate with those of the connector first mentioned.

Disadvantages of such an assembly are that the housings of the connectors have cavities receiving the terminals, which tend to collect dust, the terminals are subjected to wear when the connectors are mated and unmated, the mating tolerances of the terminals are critical, and the connectors which are external can be tampered with.

According to the invention, in an electrical connector assembly comprising an electrical connector having a housing provided with electrical terminals and a cassette incorporating an electrical circuit and being matable with the housing, in a mating direction, electrically to connect said circuit to said terminals, the connector has encapsulated therein a first electro-optical interface module containing an active electro-optical element connected to said terminals, the cassette having encapsulated therein a second electro-optical interface module containing a second active electro-optical element connected to the circuit thereof, one of said active elements being a light emitter and the other a light receiver, each module incorporating a light pipe having a first optical end surface located in light transmitting relationship with said active element of the module and a second optical end surface located in a light transmitting alignment member fixed to the module, said light pipes being so arranged in said alignment members and said alignment members being so arranged relative to the cassette and the housing that when said cassette has been mated with said housing, said second optical end surfaces lie proximate to, and in substantial alignment with, one another so as to be in light transmitting relationship, whereby the circuit of the module is electrically connected to said terminals through the medium of said active elements and said light pipes.

The alignment members can be such that they present no interstices for the collection of dust and they need no interengage in such a way that there is any significant friction between them during the mating of the cassette and the housing. Also, the alignment members may be shaped so that they can easily be cleaned by means of a simple wiping mechanism triggered by the cassette as it is being mated with the housing. One alignment member may have a convex face which is received within a concave face of the other alignment member when the cassette has been mated with the housing.

The light pipes may be in the form of optical needles received in blind bores in the alignment members. Since an optical needle is relatively rigid, the needles can easily be assembled to the alignment members.

As described in U.S. Pat. No. 4,669,820, which is incorporated herein by reference, an optical needle comprises a length of optical fiber having a rigid concentric metal coating, of constant thickness, and which is formed at each of its opposite end faces with an optical surface. The coating is applied by electroplating over a non-electro-deposited metal undercoating on the fiber. The outer metal coating of the needle may be etched down to a desired diameter.

The module and the connector may be each provided with a plurality of modules. A single alignment member in the form of a bar may be common to each module of said plurality.

Since the light transmission distances are very short, the optical losses are negligible, acceptable loss depending on the sensitivity of the light receivers, so that precise alignment of the light pipes is not critical, taking into account the choice of the diameter of the light fiber cores of said pipes.

For a better understanding of the present invention, and to show how it may be carried into effect, reference will now be made by way of example to the accompanying drawings in which.

Figure 3:
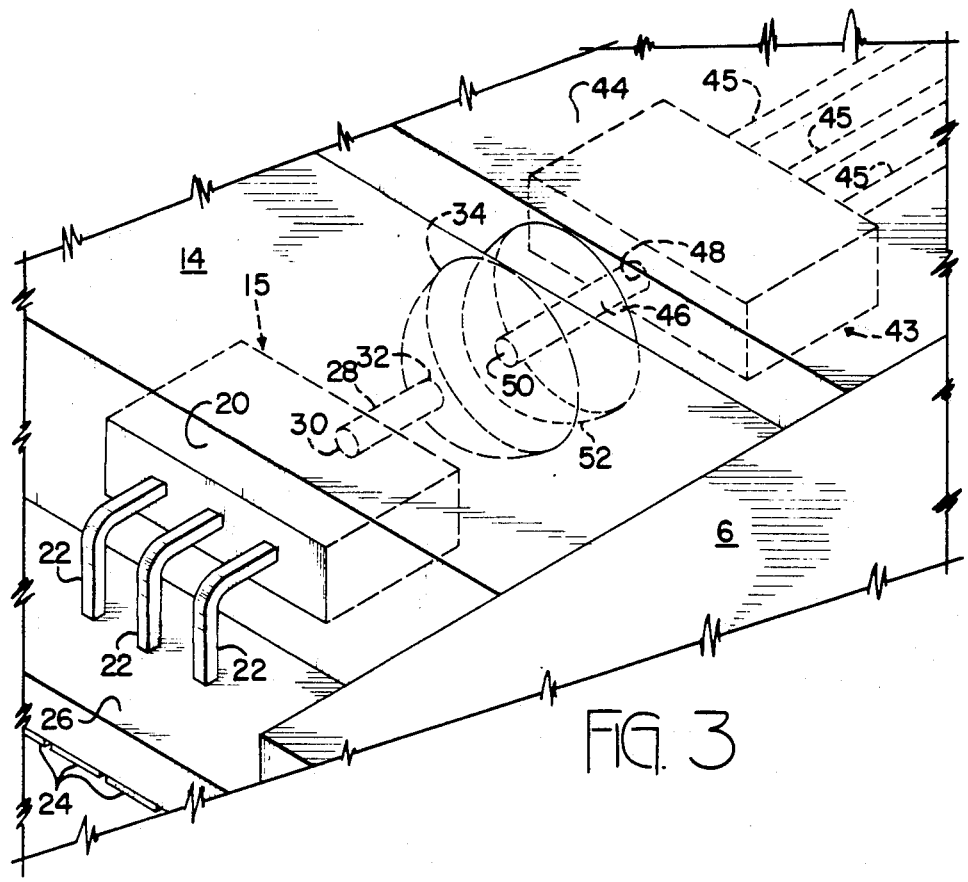
FIG. 3 is an enlarged, fragmentary, isometric diagrammatic view illustrating details of FIG. 2.
Figure 3A:
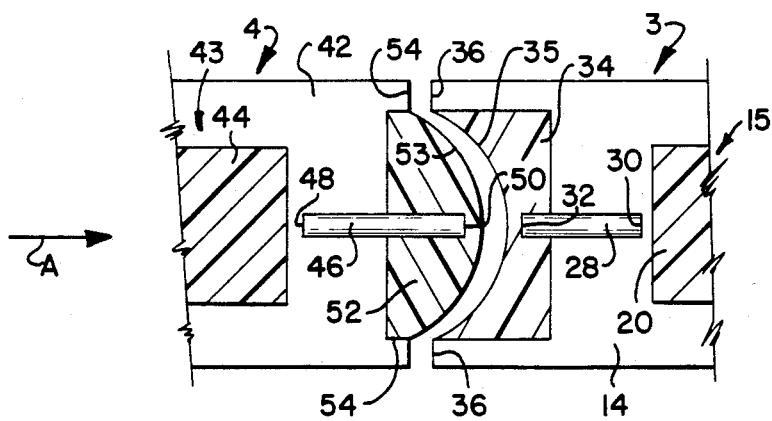
FIG. 3A is a diagrammatic sectional view illustrating details of FIG. 3.

The assembly shown in FIGS. 1 to 3A comprises an electrical connector 2 and a powered cassette 4 in the form of a flat, elongate, rectangular memory card. The connector 2 comprises an insulating housing 3 having parallel, spaced, juxtaposed guide rails 6 formed with longitudinal grooves 8 for slidably receiving the cassette 4, the guide rails 6 having card receiving ends 10 and opposite ends 12. The rails 6 are spanned, proximate to their ends 12, by an elongate connector block 14 of the housing 3, molded, for example, from a synthetic resin, and which is fixed to the rails 6 by means of tenons 16 secured in further grooves 18 formed in the rails 6, above the grooves 8, and being deeper than the grooves 8. Encapsulated in the block 14 are opto-electrical interface modules 15, only two of which are shown. Each module 15 comprises an active, optical light-receiving element 20 and a rectilinear light pipe in the form of an optical needle 28. The electrodes (not shown) of each element 20 are electrically connected to electrical terminals 22 projecting from the block 14 and which are in turn connected to conductors 24 of a circuit board 26 secured beneath the block 14 to the rails 6, the board 26 spanning the rails 6. Each optical needle 28 has a first optical end surface 30 in light transmitting relationship with the associated element 20 and a second and opposite optical end surface 32 located in a complimentary blind bore in an optical needle alignment member 34 also encapsulated in the block 14. The member 34 is light transmitting, being molded for example from glass or a clear synthetic resin, and is shaped as a concave lens, the constant radius concave surface 35 of which, is recessed in, but faces outwardly of, an abutment face 36 of the block 14, which face extends between the grooves 8, the surface 35 being bowed in a direction away from the rail ends 10. As best seen in FIG. 3A, the end surface 32 lies proximate to thee concave surface 35 of the member 34.

Figure 1:
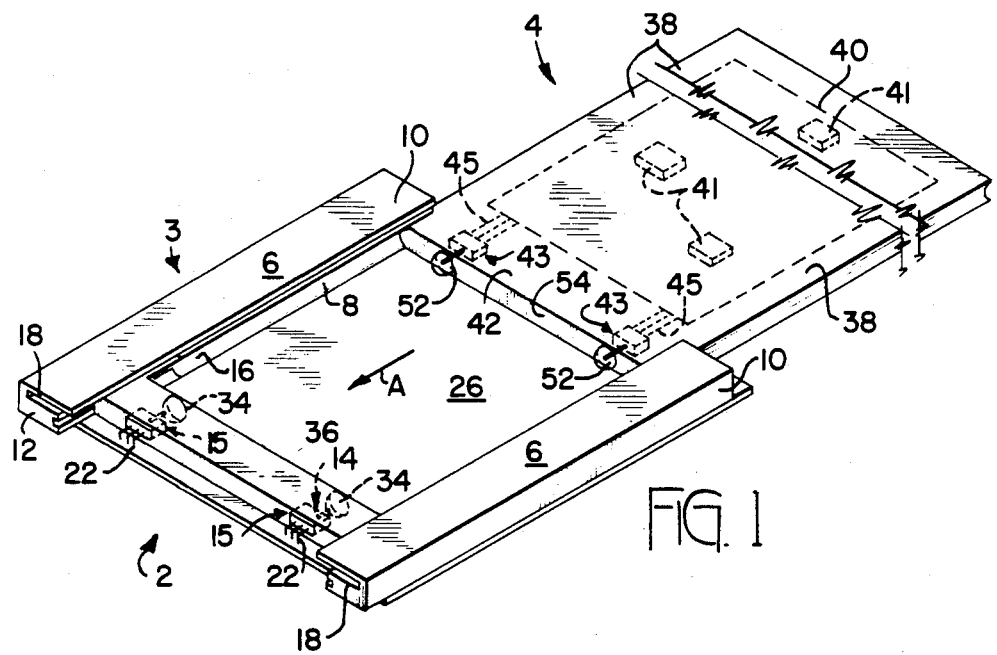
FIG. 1 is an isometric view of an opto-electrical connector assembly, according to a first embodiment of the invention, and comprising an electrical connector and a cassette for mating therewith, which are shown in an unmated condition.
Figure 2:
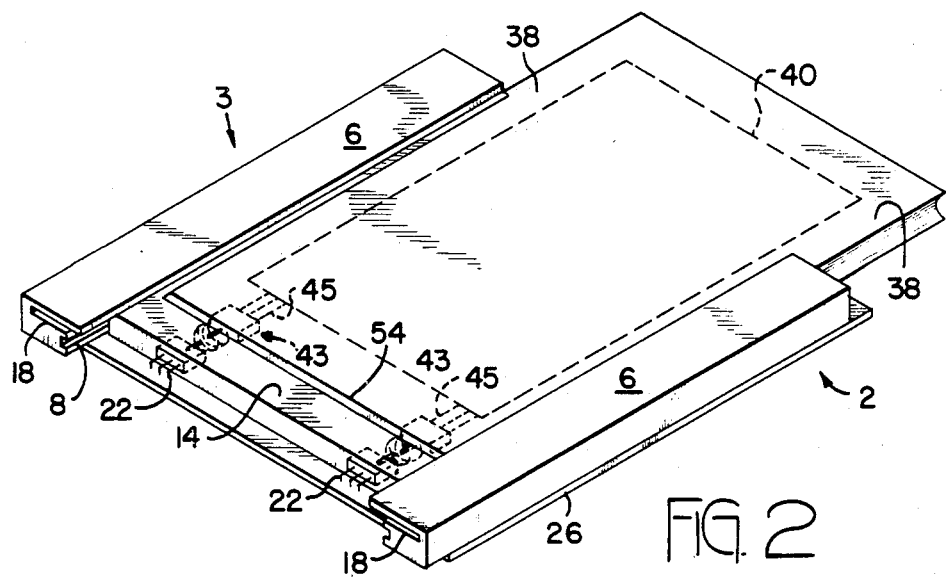
FIG. 2 is a similar view of that of FIG. 1 but showing the connector and the cassette in a mated condition.

The cassette 4, which has opposite longitudinal margins 38 which are slidably engageable in the grooves 8 of the rails 6, and which has, for example, been molded from a synthetic resin, has encapsulated therein a circuit board 40 provided with circuit elements 41 (some of which are shown in FIG. 1) of a conventional memory circuit. The cassette 4 has a transverse leading margin 42 in which are encapsulated opto-electrical interface modules 43, only two of which are shown. Each module 42 comprises an active optical light emitting element 44 and a rectilinear light pipe in the form of an optical needle 46 having a first optical end surface 48 in light transmitting relationship with the element 44 and a second and opposite optical end surface 50 located in a complementary blind bore in an optical needle alignment member 52, which is light transmitting, being molded for example from the same material as the alignment members 34, and which is in the form of a convex lens having a convex surface 53, of constant radius, which is substantially complementary with the concave surface 35 of an alignment member 34. The surface 53 projects from an abutment face 54 of the margin 42, being bowed in a direction towards the ends 10 of the rails 6. As best seen in FIG. 3A, the end surface 50 lies proximate to the convex surface 53 of the member 52. The electrodes (not shown) of each element 44 are connected by way of conductors 45 to circuitry of the board 40.

As shown in FIG. 3A, the end surface 32 of the light pipe 28 is spaced slightly back from the concave surface 35, the surface 50 of the light pipe 46 being spaced slightly back from the convex surface 53.

In order electrically to connect the circuitry of the board 40 of the cassette 4 to the terminals 22 of the connector 2, and thus to a further circuit for example of a business machine, connected to the conductors 24, for example by means of a conventional circuit board connector, the cassette 4 is inserted between the rails 6 at their ends 10, as shown in FIG. 1 and is pushed home to mate the cassette 4 with the housing 3, in the direction of the arrow A in FIGS. 1 and 3A until the abutment face 54 of the cassette 4 engages the abutment face 36 of the block 14, whereby the surface 53 of each alignment member 52 is received within the surface 35 of the opposite alignment member 34 whereby the optical face 50 of each optical needle 46 is brought into light transmitting, proximate, relationship with the optical face 32 of the opposite optical needle 28. Thus in the mated condition of the cassette 4 and the housing 3 coded electrical signals received from the circuitry of the board 40 by the elements 44 through their leads 45 are converted into light signals by the elements 44, which signals are transmitted via the optical needles 46 and 28 to the elements 20 where they are reconverted into further electrical signals which are applied by the elements 20 to the terminals 22, and thence to said external circuit. Since the signals are coded, the operation of the elements 20 and 44 cannot be disturbed by ingress of outside light into the alignment members.

Alternatively, the block 14 could be provided with convex alignment members 52, the cassette 4 being provided with concave alignment members 32.

Figure 4:
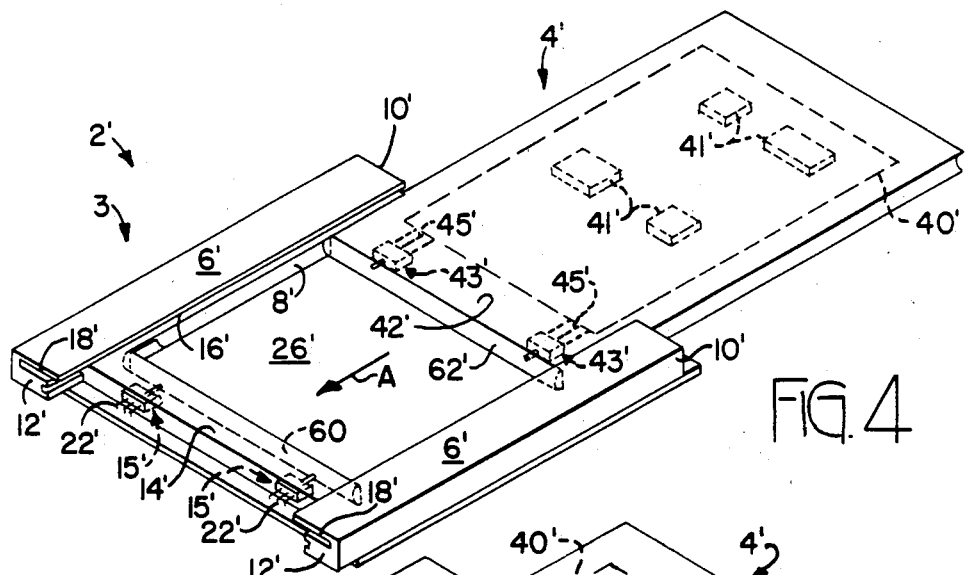
FIGS. 4 and 5 are views similar to those of FIGS. 1 and 2, respectively, but illustrating an opto-electrical connector assembly according to a second embodiment of the invention.
Figure 5:
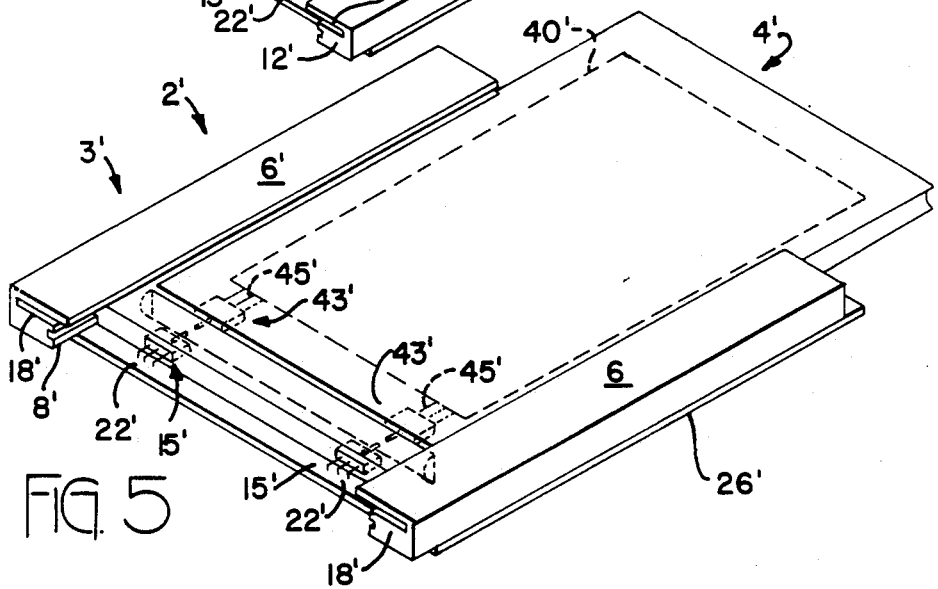
Figure 6:
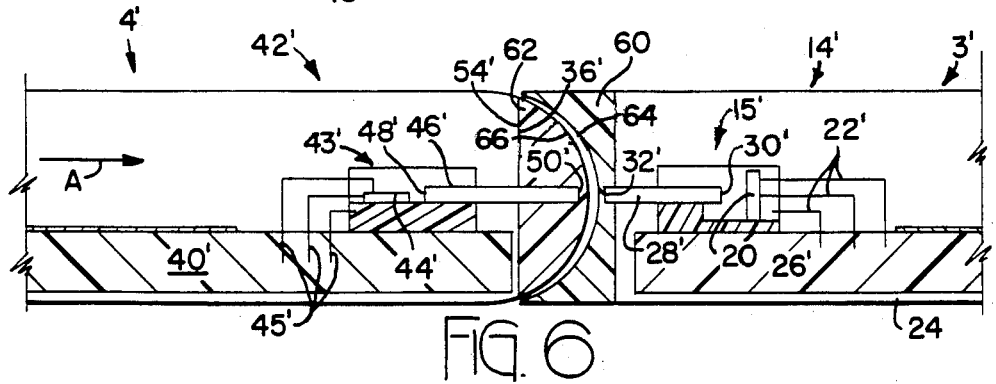
FIG. 6 is a fragmentary, diagrammatic side view illustrating details of FIG. 5.

The second embodiment of the invention will now be described with reference to FIGS. 4 to 6 in which those parts which are the same as corresponding parts described above with reference to FIGS. 1 to 3A, bear the same reference numerals but with the addition of a prime symbol. In the second embodiment, the alignment members 34 are replaced by a common alignment member 60 in the form of a light transmitting bar extending along the full length of the abutment surface 36' and into blind bores in which the optical needles 28' are fitted, the alignment members 52 being replaced by a common alignment member in the form of a light transmitting bar 62 into openings in which the optical needles 46' are fitted. The bar 60 has a concave surface 64 of constant radius extending therealong, the bar 62 having a convex surface 66 of constant radius, extending therealong and projecting from the abutment face 54' to be received within the concave surface 64, when the cassette 4' has been pushed fully home into mating relationship with the housing 3' as shown in FIG. 6.

We claim:

1. An electrical connector assembly comprising an electrical connector having a housing provided with electrical terminals, and a powered cassette incorporating an electrical circuit and being mateable with the housing, in a mating direction, electrically to connect said circuit to said terminals, the connector having encapsulated therein along an elongate edge thereof a first row of electro-optical interface modules each containing an active electro-optical element connected to said terminals, the cassette having encapsulated therein along an elongate edge thereof a row of second opto-electrical interface modules each containing a second active opto-electrical element connected to the circuit thereof, said active elements of said cassette each being a light emitter and those of said connector each being a light receiver, each module incorporating a light pipe having a first optical end surface located in light transmitting relationship with said active element of the module and a second optical end surface enclosed within a light transmitting alignment member said alignment members being encapsulated in said respective elongate edges and projecting therefrom, said light pipes being so arranged in said alignment members and said alignment members having smooth loosely interfitting mating faces so arranged relative to the cassette and the housing that when the cassette has been mated with the housing, said second optical end surfaces lie proximate to, and in substantial alignment, with one another so as to be in light transmitting relationship, whereby the circuit of the module is electrically connected to said terminals through the medium of said active elements and said light pipes.

2. An assembly as claimed in claim 1, wherein said alignment members have respective convex and concave surfaces which lie proximate to one another when the cassette has been mated with the housing, the light pipes extending radially of said surfaces substantially along common radii thereof, when the cassette has been mated with the housing.

3. An assembly as claimed in claim 1, wherein each alignment member is in the form of a bar, each bar extending at right angles to said mating direction, the light tube of each module being received in an individual opening in the respective bar.

4. An assembly as claimed in claim 1, wherein the light pipes are in the form of optical needles which extend into blind bores in the alignment members.

5. An assembly as claimed in claim 1, wherein the housing comprises a pair of parallel guide rails for the cassette, the first electro-optical module being encapsulated in a block spanning said rails proximate to one end thereof and the cassette being receivable between the rails from the other end thereof, and having a leading end face for engagement with said block, said second electro-optical module being encapsulated in a margin of said cassette proximate to said leading end face.

6. An assembly as claimed in claim 5, wherein said rails are spanned by a circuit board to conductors of which said terminals are electrically connected.

7. An electrical connector assembly comprising an electrical connector having a housing, provided with electrical terminals, and a powered electronic memory card incorporating an electronic circuit and being matable with the housing electrically to connect said circuit to said terminals, the connector being provided with a row of first electro-optical interface modules encapsulated in said housing and each containing an active electro-optical element connected to selected ones of said terminals, said card having encapsulated therein a row of second electro-optical interface modules each containing an active electro-optical element selectively connected to circuitry of said card, said second modules being equal in number to said first modules, said active elements of said first modules being light receivers and said elements of said second modules being light emitters, each module incorporating an optical needle having a first optical end surface located in light transmitting relationship with said active element of the module and having a second optical end surface enclosed within a light transmitting optical needle alignment member which is fixed in relation to the module, the alignment members of the housing of the electronic memory card having smoothly arcuate, complementary, loosely interfitting mating faces which lie proximate to each other when said card has been mated with the housing so that the second optical end surface of each optical needle of the housing is in light transmitting relationship with the second optical surface of a corresponding optical needle of said card, whereby the circuitry of the card is electrically connected to the terminals of the connector through the medium of said active optical elements and said optical needles.

8. A flat rectangular powered cassette incorporating an electrical circuit, and having an elongate margin in which is encapsulated a row of electro-optical interface modules each containing an active electro-optical light emitting element having electrodes electrically connected to said electronic circuit, said row extending lengthwise of said margin, each module incorporating a light pipe having a first optical end surface located in light transmitting relationship with said active element and a second optical end surface enclosed within a bore in a light transmitting alignment member fixed in an edge of said margin, each said bore extending normally of said edge and each said second optical end surface facing outwardly of said edge proximate to, but back from, an outer surface of said alignment member which outer surface is smoothly arcuate.

9. A cassette as claimed in claim 8, wherein said outer surface is convex, is of constant radius, and is bowed in a direction away from said edge, the light pipe extending radially of said convex surface.

10. A cassette as claimed in claim 8, wherein said outer surface is concave, is of constant radius, and is bowed inwardly of said edge, the light pipe extending radially of said concave surface.

11. A cassette as claimed in claim 8, wherein said light pipe is in the form of a rectilinear optical needle, said second optical surface being received in a blind bore in said alignment member.

12. An opto-electrical connector comprising:
a pair of parallel, spaced, juxtaposed guide rails for slidably receiving between them a powered electronic memory card, from one end of said pair of rails;
an elongate insulating block spanning the rails of said pair at a position proximate to the other end of said pair of rails;
a plurality of electrical terminals projecting from said block;
a row of electro-optical interface modules encapsulated in said block and extending lengthwise thereof, each module contaning an active electro-optical light receiving element having electrodes electrically connected to respective ones of said terminals, each said module incorporating a light pipe having a first optical end surface located in light transmitting relationship with said active element of the module and a second optical end surface; and
a light transmitting alignment member secured to a side of said block facing the one end of said pair of rails, each said second optical end surface being enclosed within said alignment member so as to face said one end of the pair of rails and so as to be proximate to a smoothly arcuate mating surface of said alignment member which surface faces said one end of said pair of rails.

13. A connector as claimed in claim 12, wherein said surface of said alignment member is concave, and is of constant radius and is bowed in a direction away from said one end of the pair of rails.

14. A connector as claimed in claim 12, wherein said surface of said alignment member is convex, is of constant radius and is bowed towards said one end of the pair of rails.

15. A connector as claimed in claim 12, wherein said light pipe is in the form of an optical needle, said second optical surface being received in a blind bore in said alignment member.

16. A connector as claimed in claim 12, wherein the rails of said pair are spanned by a circuit board which is secured thereto, said terminals being electrically connected to electrical conductors of said circuit board.

17. A two part electrical connector assembly for connecting electrical terminals to electrical circuitry, the connector assembly comprising a first part carrying the terminals and a second part carrying said circuitry and being matable with the first part, said parts having means cooperating electrically to connect the circuitry to said terminals when the parts have been mated; said connecting means comprising a light emitting, opto-electrical interface module on one of the parts and a light receiving, opto-electrical interface module on the other of said parts, said modules having mating faces formed as a concave and a convex lens, respectively.

* * * * *